United States Patent [19]

Serota

[11] 3,974,846

[45] Aug. 17, 1976

[54] APPARATUS AND METHOD FOR GAINING ACCESS TO THE CONTENTS OF PRESSURIZED VESSELS AND SYSTEMS

[76] Inventor: Samuel Serota, 1809 Mower St., Philadelphia, Pa. 19152

[22] Filed: Feb. 25, 1974

[21] Appl. No.: 445,741

Related U.S. Application Data

[63] Continuation-in-part of Ser. No. 271,893, July 14, 1972, abandoned, which is a continuation-in-part of Ser. No. 75,399, Sept. 25, 1970, abandoned.

[52] U.S. Cl. ............................. 137/15; 137/318
[51] Int. Cl.² ........................................ F16K 51/00
[58] Field of Search ............ 137/15, 315, 317, 318; 251/214; 29/157.1, 213; 285/199

[56] References Cited
UNITED STATES PATENTS

| | | | |
|---|---|---|---|
| 1,065,248 | 6/1913 | Hinman | 137/318 |
| 2,314,013 | 3/1943 | Mueller et al. | 137/318 X |
| 2,870,629 | 1/1959 | Willis | 29/213 X |
| 3,038,484 | 6/1962 | Smith | 137/15 |
| 3,104,456 | 9/1963 | Powell, Jr. | 137/15 X |
| 3,229,711 | 1/1966 | Leopold, Jr. et al. | 137/318 |

*Primary Examiner*—Henry T. Klinksiek
*Attorney, Agent, or Firm*—M. Howard Silverstein; William E. Scott; David G. McConnell

[57] ABSTRACT

An apparatus and method for gaining access to the contents of pressurized vessels and systems and for discharging the contents safely under controlled conditions. The apparatus, comprised essentially of a ball valve and pressure tube assembly having a coaxial conduit in which is mounted for longitudinal movement a rotatable shaft and drill bit, is connected to the pressurized vessel. The rotatable shaft in the preferred embodiment is provided with fluid conducting means so that when communication with the contents of the vessel is made, pressure on both ends of the shaft is equalized. At this point, the ball valve is shut off, the pressure tube assembly, shaft and drill bit are removed, and a hose or other take-off device is connected to the ball valve for safe disposal of the contents of the pressurized vessel.

13 Claims, 8 Drawing Figures

APPARATUS AND METHOD FOR GAINING ACCESS TO THE CONTENTS OF PRESSURIZED VESSELS AND SYSTEMS

This application is a continuation-in-part of my co-pending application for patent Ser. No. 271,893, filed July 14, 1972, now abandoned, which is a continuation-in-part of Ser. No. 75,399, filed Sept. 25, 1970, now abandoned.

This invention relates to a process and apparatus for gaining access to the contents of cylinders and systems containing compressed fluids under pressure. More particularly, it relates to a process and apparatus for safely gaining access to and communicating with the contents of pressurized gas-filled vessels having discharge valves which, subsequent to the tilling of the vessles with gas under prescribed pressure, have become non-functioning and incapable of being operative for controlled discharge of the gas from the vessels. Still more particularly, it relates to a process and apparatus by which, in addition to gaining safe access into pressurized vessels as described above, the contents of said vessels can be safely and economically recovered.

For a manufacturer, a refiller or a distributor of compressed gases, chemicals or other materials, a large inventory of unusable cylinders represents a sizeable and undesirable liability. However, because of the increased and widespread use of these compressed materials in recent years, just such an inventory of unusable cylinders having corroded valves, broken stems and/or other malfunctioning parts has accumulated. Some of these cylinders contain very corrosive gases such as hydrogen chloride, hydrogen bromide and boron trifluoride under many hundreds of pounds of pressure and present a particularly difficult problem in safe disposal.

Apparatus for connecting to service lines such as water and gas mains are well known in the art. Leopold et al (U.S. Pat. No. 3,229,711) describe such an instrument. However, because of the high pressure that the apparatus of the present invention was designed to withstand and because of certain construction details of the present apparatus that will be apparent later in the specification, Leopold et al's instrument cannot be used for the purposes of this invention.

Prior to the present invention no satisfactory method or apparatus has been available to effectively and safely gain access to the contents of pressurized vessels, especially those containing corrosive or otherwise hazardous and dangerous materials. If an inoperable valve leaks, the contents of the cylinder are usually allowed to bleed into a large intake fan which sucks the contents into a scrubber where they are dissolved in water or neutralized with soda ash or ammonia and run off as waste. Other cylinders containing corrosive and/or hazardous materials but without leakage are usually just stored in an open space to await some means of emptying the contents so that the cylinder can be fitted with a new valve and returned to profitable usage or of safely disposing of the cylinder and its contents.

The present invention provides a safe and relatively simple means for gaining access to and for communicating with and for recovering the contents of pressurized vessels whose normal and usual means of allowing the contents to be controllably discharged have been rendered inoperable and non-functioning.

An object of this invention is to provide a safe, simple and efficient means of gaining access to and communicating with the contents of cylinders or other vessels containing compressed materials under pressure.

Another object of this invention is to provide a safe, simple and efficient means of recovering the contents of cylinders or other vessels contaning compressed materials under pressure when the normal and usual means of controllably releasing the contents have become inoperable and non-functioning.

A further object is to provide a means by which a cylinder or other vessel containing compressed materials under pressure having a defective or otherwise inoperable and non-functioning valve or controllable discharge mechanism may be emptied of its compressed contents and fitted with a new and operable valve or controllable discharge mechanism thereby recovering the cylinder or vessel for further profitable use.

Still another object is to provide apparatus for accomplishing the above stated means.

According to this invention the foregoing objects are accomplished by a generally tubular shaped device or apparatus comprised of a compressed fluid holding means, a fluid flow regulating means, a fluid conveying means common to both of the aforesaid means, a cutting means, rotatable means for rotating said cutting means, joining means for fastening the device to a vessel containing compressed fluids and pressure tight sealing means to prevent escape of compressed fluids. The cutting means and the rotatable means are mounted for longitudinal movement within the fluid conveying means and in one of the embodiments the rotatable means is provided with fluid conducting and pressure equalizing means for equalizing the pressure on both ends of said means. The joining means is provided with internally recessed means for collecting metal and other chips and shavings. Since vessels or cylinders containing compressed fluids are provided with various types of CGA (Compressed Gas Association) or other standard fittings on the valve depending on the contents of the vessel, a joining means provided with the appropriate types of sealing and threading means is used for each particular type of fitting.

Two embodiments of this invention, both of which will accomplish the foregoing objects and both of which are generally tubular shaped will be described in detail later. Although the tubular shape is probably the most efficient and most adaptable design for the use to which the device has been conceived, other geometrical shapes could be used with equal success. In general, this invention is an apparatus for providing a safe, simple and efficient means of communicating with the contents of a vessel containing compressed fluids when the usual method of doing so has been rendered inoperable and non-functioning. More definitely, the apparatus is comprised of a pressure tube assembly and ball valve having a coxial conduit and pressure tight sealing means to prevent escape of compressed fluids. A rotatable shaft and drill bit are mounted for longitudinal movement within the conduit and in one of the embodiments, the rotatable shaft is provided with fluid conducting and pressure equalizing means to equalize the pressure on both ends of the shaft after the drill bit has communicated with the contents of the vessel. The pressure tight sealing means within the pressure tube assembly and ball valve are provided by O-rings or by curved surfaces. O-rings that are so positioned that they are subject to deformation and extrusion by the forces exerted upon them are provided with backup rings. The fluid conducting and pressure equalizing means is provided by a passageway extending generally coaxially through the shaft from a point adjacent to the forward end of the shaft to a point adjacent to the rear of the shaft. The fluid conducting and pressure equalizing means is, alternatively, provided by a hollow shaft having two orifices, one adjacent to the forward end and one adjacent to the rear of the shaft. Pressure tight adapting means for connecting the apparatus to a valve of the vessel and means for rotating the shaft are also provided. The adapter or adapting means is provided with means for attaching it at one end to a vessel containing compressed materials and at the other end to the ball valve. The adapter is also provided with internally recessed means to allow metal chips and shavings resulting from drilling operations to be removed from the boring shaft conduit. The internally recessed means is placed adjacent to or at least near the drill bit so that the chips and shavings can be removed from the shaft conduit as soon as possible.

The apparatus of this invention is especially useful in providing a safe, simple and efficient means of communicating with the contents of vessels containing compressed fluids when a valve, which has a stem and a seat and is an integral part of the vessel for safely and controllably communicating with the contents, has been rendered inoperable and non-functioning. As previously stated, pressure tight sealing is provided by curved surfaces or by O-rings which provide the same effect as the curved surfaces. The internally recessed chip collecting means in the adapter is also provided with a curved surface. The use of either type of sealing means and the elimination of angled or notched surfaces is essential when operating at high pressures in order to forestall hydrogen embrittlement of the metal and catastrophic failure and collapse of the apparatus. When a curved surface is used in the apparatus of the present invention, the surface is provided with a generous radius as an additional safety factor to forestall failure of the metal by hydrogen embrittlement.

Although the apparatus can be constructed of many metals and alloys depending on the use to which it is to be put, it should be constructed of a material that is resistant to hydrogen embrittlement such as an austenitic steel characterized by having a face-centered cubic crystal structure if it is to be used to gain access to the contents of pressurized vessels. An example of such a metal is 316 stainless steel.

The apparatus of this invention can be safely used on vessels in which the contents are under in excess of 10,000 lbs./sq. inch pressure which is not possible with presently available apparatus. In addition, the apparatus of this invention can be safely used to gain access to and discharge and/or recover the contents of vessels containing toxic, corrosive and/or flammable fluids, such as hydrogen, hydrogen chloride, hydrogen bromide and others, under high pressure. No presently available apparatus can be used for this purpose. Another important feature of this invention is that the vessel from which the fluid is discharged or recovered is not harmed or destroyed and needs no repairs or alterations and therefore can be immediately reused.

The two embodiments are now described with reference to the drawing, wherein.

Figure 1:
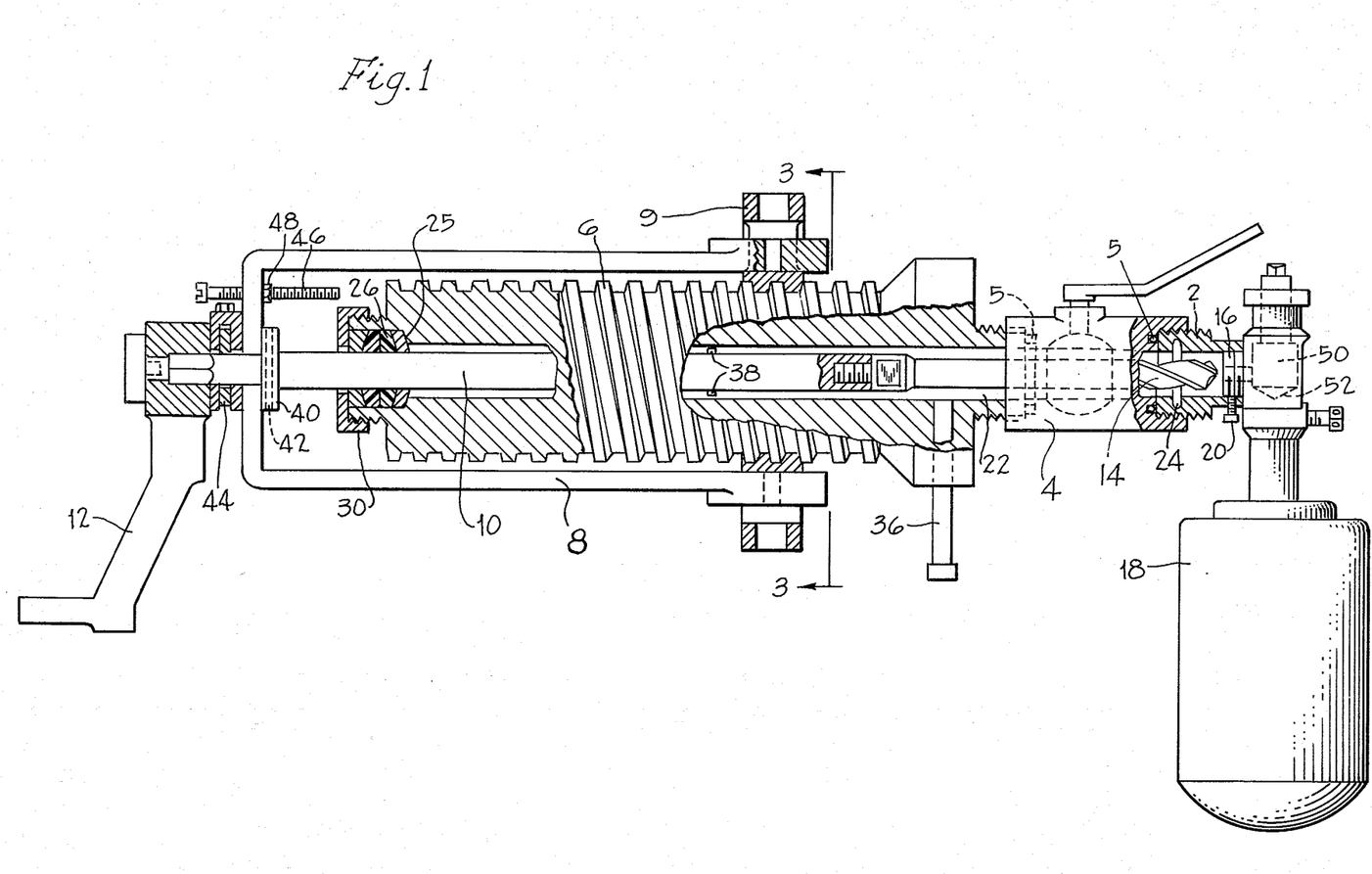
FIG. 1 is a side view partly in cross-section of the fully assembled first embodiment of the device.

The first embodiment of the apparatus for gaining access to vessels containing compressed materials is comprised of five major parts as shown in FIG. 1: adapter 2, ball valve 4, pressure tube assembly 6, yoke 8 with handle 9, boring shaft 10 having handle 12 and drill bit 14. Adapter 2 threaded pressure tight on valve 16 of vessel 18 and held immovably in place by set screw 20 or any other suitable holding device is provided along its axis and communicating with boring shaft and gas or fluid conducting conduit 22 with a U-shaped recessed cavity 24. Ball valve 4 is threaded pressure tight to adapter 2 and to pressure tube assembly 6 and is sealed pressure tight to both 2 and 6 by O-rings 5. When ball valve 4 is open it allows drill bit 14 and boring shaft 10 to move longitudinally in conduit 22 into adapter 2. The preferred type of ball valve is one that is provided with at least 3 Teflon gaskets for gas tight sealing; however, other types of gaskets may be used. Pressure tube assembly 6 is fitted at the rear end with gasket assembly 26 consisting of two stainless steel or other suitable metal, preferably an austenitic type, gaskets or washers each concave on one side and two Teflon gaskets or washers each convex on one side and a cap 30. When cap 30 is tightened, gasket assembly 26 makes a pressure tight seal around shaft 10. The surface 25 of pressure tube assembly 6 where it meets assembly 26 is curved with a generous radius. Pressure tube assembly 6 is also provided with a bleed valve 36 located near the forward end of the assembly. Boring shaft 10 and drill bit 14 extend coaxially through pressure tube assembly 6 and ball valve 4. Shaft 10 is provided with projections 38 to control the extent of rearward movement of the shaft in case of sudden release of gas or fluid from the pressurized vessel; rearward movement of shaft 10 will stop when projections 38 contact gasket assembly 26. The terminal end of shaft 10 is narrower than the forward section and collar 40, which is held in place on the shaft by roll pin 42, fits snugly against the end of the larger diameter section of the shaft. When the apparatus is in operation clamping collar 44 presses yoke 8 against collar 40 thus preventing the yoke from disengaging. Bolt 46 with lock nut 48 is provided to regulate the distance that yoke 8 and thus shaft 10 can travel forward thus regulating how far drill bit 14 can penetrate valve stem 50 and valve seat 52 of vessel 18. The curved surfaces at 24 and 25, each with a generous radius, are provided so that the apparatus can be used to gain access to and safely discharge or recover from vessels contents which are under a very high pressure and, as previously noted, to greatly lessen the possibility of hydrogen embrittlement of the metal and the resulting catastrophic failure and rupture of the apparatus. The apparatus can be constructed of any metals or alloys; however, for reasons of safety and economy, 316 stainless steel or other austenitic metals are preferred.

The process for gaining access to vessels containing compressed materials using the just described embodiment of the apparatus will be described with reference to FIG. 1.

Before attaching the apparatus of this invention to the vessel, the vessel valve is hand or machine drilled with a collared bit. The collar is so located that it will allow the bit to drill only to the valve stem but not into it. When this is complete and the bit retracted, the filings and chips from the drilling operation are removed usually by brushing or by air pressure or both. Then adapter 2 is threaded pressure tight onto valve 16 of vessel 18 and held in place by tightening set screw 20. The forward end of ball valve 4 is threaded pressure tight onto adapter 2, pressure tube assembly 6 with shaft 10 in place and bit 14 attached to its forward end is threaded pressure tight onto ball valve 4. Before proceeding to drill through valve stem 50 and into valve seat 52, bleed valve 36 and ball valve 4 are opened, cap 30 is threaded pressure tight onto gasket assembly 26, and handle 9 is turned to draw yoke 8 tightly up on assembly 6 thus applying pressure to collar 40 and transmitting the pressure to shaft 10 and bit 14. Shaft 10 is then hand or power turned until the initial resistance to the cutting action of bit 14 is substantially reduced. At this point, the operation of drawing yoke 8 tightly up on assembly 6 and drilling until resistance to the cutting action of bit 14 is substantially reduced is repeated as often as necessary to drill into valve stem 50, cut out valve seat 52 and communicate with the contents of vessel 18. Since yoke 8 remains stationary during the drilling operation, lubricant is lightly applied to that portion of the inner and outer surfaces of yoke 8 between collars 40 and 44 to reduce friction. Filings and metal chips from the drilling operation fall into recessed cavity 24 and are thus removed from the path of boring shaft 10 and bit 14. At this stage the contents of vessel 18, usually gaseous, will escape through the opening made in valve stem 50 and follow the path of shaft 10 through conduit 22 to issue into the atmosphere from bleed valve 36. Valve 36 is then closed, shaft 10 with drill bit 14 is retracted fully thus allowing clearance to close ball valve 4. Pressure tube assembly 6 complete with shaft 10 and drill bit 14 is unthreaded and completely detached from ball valve 4. Any convenient hose or take-off pipe is then attached to valve 4 so that the contents of vessel 18 can be recovered or safely disposed of.

The amount of penetration into valve stem 50 to cut out seat 52 that can be accomplished in the drilling operation is preset by the position of bolt 46. In the preferred operation bolt 46, which is held in a preset position by locknut 48, contacts the solid rear face of assembly 6 when bit 14 has bored far enough to cut out valve seat 52. This arrangement is a safety measure which prevents the drill bit from boring a hole through the side of the valve body opposite that to which the apparatus is connected and causing an extremely hazardous situation by the uncontrolled releasing of the contents of the vessel into the surrounding atmosphere.

The size of drill bit 14 that is used in a particular operation depends on the type and construction of the valve that is to be penetrated.

This embodiment of the invention is especially useful to safely communicate with the contents of any compressed gas cylinder equipped with a C.G.A. or other equivalent valve. Pressures up to about 4000 lbs./sq. inch are found in such cylinders. However, this embodiment is not limited to such cylinders and can be used with vessels containing gases or fluids under much higher pressure.

Figure 2:
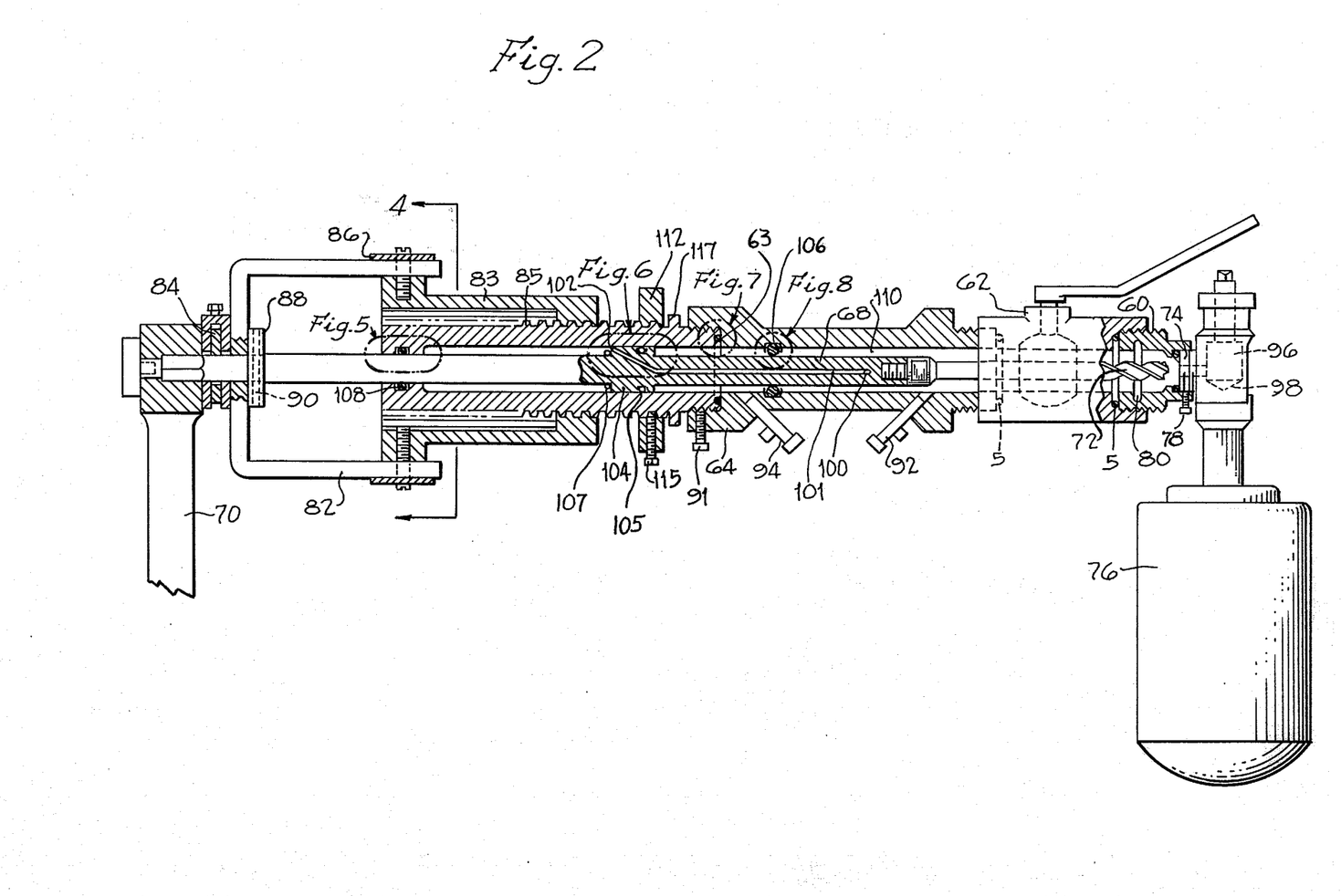
FIG. 2 is a side view partly in cross-section of a second embodiment of the device.
Figure 3:
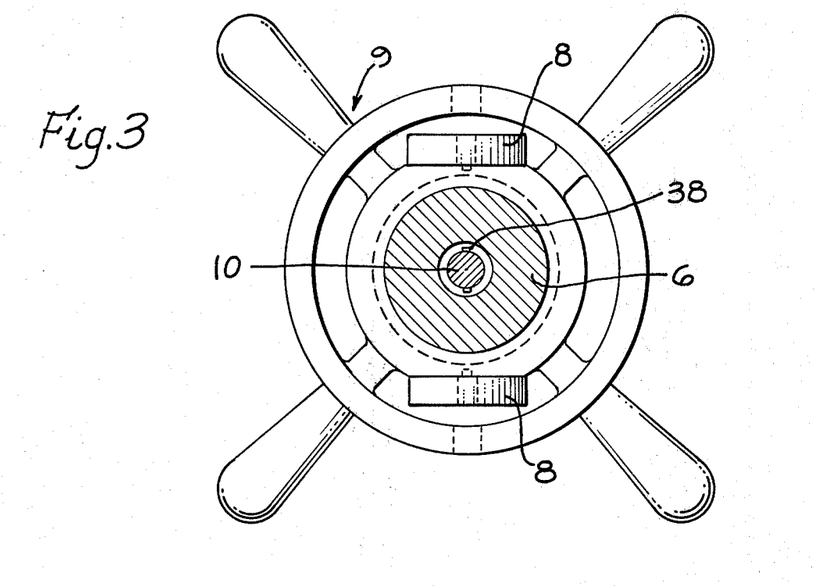
FIG. 3 is a sectional view taken generally in the direction of and along line 3—3 of FIG. 1.
Figure 4:
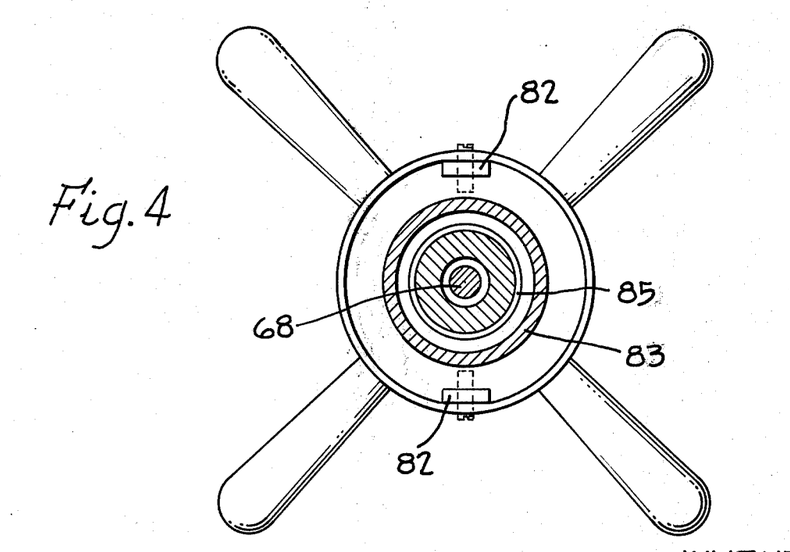
FIG. 4 is a sectional view taken generally in the direction of and along line 4—4 of FIG. 2.
Figure 5:
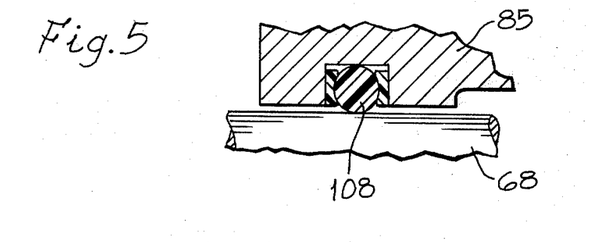
FIG. 5 is a sectional detail indicated by the area shown as FIG. 5 in FIG. 2.
Figure 6:
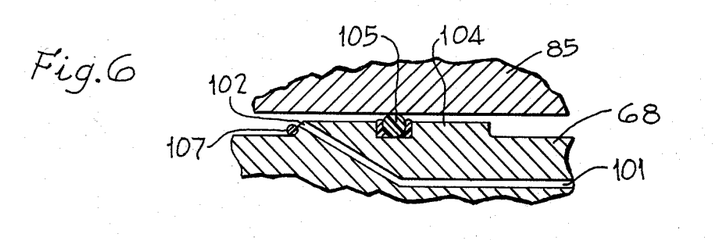
FIG. 6 is a sectional detail indicated by the area shown as FIG. 6 in FIG. 2.
Figure 7:
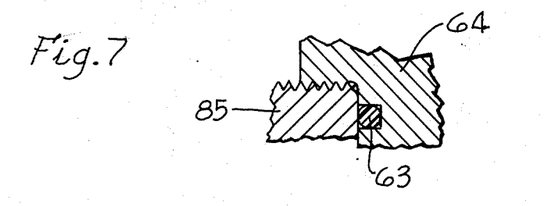
FIG. 7 is a sectional detail indicated by the area shown as FIG. 7 in FIG. 2.

The second embodiment of the apparatus of this invention as shown in FIGS. 2, 4, and 5–8 is comprised essentially of the following major components, namely: adapter 60, ball valve 62, pressure tube assembly 64, yoke 82 with handle 86, boring shaft 68 having handle 70 and drill bit 72. Adapter 60 threaded pressure tight on valve 74 of vessel 76 is held immovably in place by set screw 78 and is provided with a somewhat U-shaped recessed cavity 80 for catching and removing metal filings and chips from the path of boring shaft 68 and drill bit 72. Ball valve 62 is the same as valve 4 in FIG. 1 and is provided with the same O-rings 5 for the same purpose. As shown in FIGS. 2 and 7, O-ring 63, at the bottom of the threads of assembly 64 where 64 engages externally threaded portion 85, is provided for pressure tight sealing at this point. The forward end of ball valve 62 is threaded pressure tight onto adapter 60, pressure tube assembly 64 with its externally threaded portion 85 is threaded pressure tight onto the rear of ball valve 62, and cylindrical member 83 engages both threaded portion 85 and yoke 82.

Figure 8:
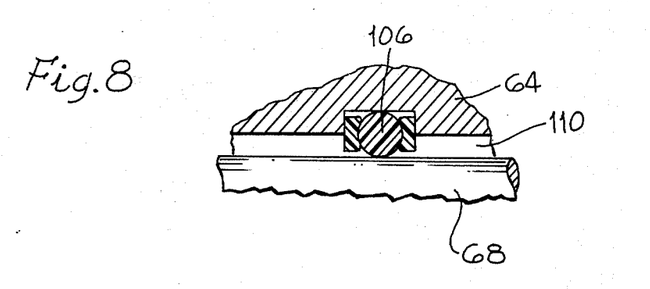
FIG. 8 is a sectional detail indicated by the area shown as FIG. 8 in FIG. 2.

Yoke 82 is held securely in place by clamping collar 84 and with cylindrical member 83 is turned by yoke handle 86. As yoke handle 86 is tightened, yoke 82 and member 83 are drawn forward on threaded portion 85 thus exerting a forward pressure on shaft 68 through metal collar 88 which is held stationary by roll pin 90 and other similar device. As in the operation of the first embodiment, yoke 82 does not turn during the drilling operation, so lubricant is applied to that portion of the inner and outer surfaces of yoke 82 between collars 84 and 88 to reduce friction while drilling. The externally threaded rear portion of assembly 64 is held in position and prevented from turning by set screw 91 or other suitable device. The apparatus is provided with two bleed valves 92 and 94. When drill bit 72 penetrates valve stem 96 and valve seat 98 of vessel 76, the compressed gaseous or fluid contents of vessel 76 escape through bleed valve 92, thus indicating that communication has been made with the contents of vessel 76. Boring shaft 68 is provided with a first orifice 100 immediately adjacent the point of attachment of drill bit 72 and second orifice 102 immediately adjacent and to the rear of O-ring assembly 105 (FIGS. 2 and 6) and shaft collar 104. Shaft 68 which is provided with a passageway 101 between orifice 100 and orifice 102 is also provided with two O-ring assemblies, 106 and 108 as shown in FIGS. 2, 5, and 8. The term "O-ring assembly" is used to define a combination of an O-ring with a back-up ring or other supporting member on each side of the O-ring to reduce deformation of the O-ring and provide sealing that can withstand very high pressures. When valve stem 96 and valve seat 98 have been penetrated by bit 72 the compressed gaseous or fluid contents of vessel 76 escape and flow through conduit 110 surrounding shaft 68 until they reach O-ring assembly 106 thus pressurizing the conduit 110 between O-ring assembly 106 and drill bit 72. The contents also flow through the passageway 101 of shaft 68 from orifice 100 to emerge at orifice 102 and pressurize conduit 110 between O-ring assembly 105 and O-ring assembly 108. After valve stem 96 has been penetrated the only unpressurized portion of conduit 110 is that portion between O-ring assembly 106 and O-ring assembly 105. Consequently, escape of any of the contents of vessel 76 through bleed valve 94 is an indication of a leak at either or both O-ring assembly 106 or O-ring assembly 105. As in the first embodiment, the terminal end of the shaft is narrower than the forward section and collar 88 fits snugly against the end of the larger diameter section of the shaft. Lock nut 112 which is fixed in position by set screw 115 is provided to regulate the distance member 83 can travel thus regulating how far drill bit 72 can penetrate valve stem 96 and valve seat 98 of vessel 76. Hexagonal collar 117 which is used mainly in assembling and disassembling the apparatus is provided for drawing pressure tube assembly 64 tight to its externally threaded portion 85.

As shown in FIG. 6, shaft 68 is provided with an O-ring 107 immediately adjacent to the rear of shaft collar 104. In the event of an unexpected pressure release caused by a defect or failure of some part of the apparatus, the operator then retracts yoke 82 which automatically draws shaft 68 rearward until it reaches the end of conduit 110 at which point O-ring 107 functions as a pressure tight seal between the end of conduit 110 and shaft collar 104 thus preventing escape of fluid.

The curved surface at 80 in FIG. 2 serves the same purpose as those at 24 and 25 in FIG. 1. As in the first embodiment, the apparatus as shown in FIG. 2 can be constructed of many metals or alloys; however, 316 stainless steel or other austenitic metals or alloys are preferred. This embodiment of the invention can be safely used on vessels in which the contents are under in excess of 10,000 lbs./sq. inch pressure.

The process for gaining access to vessels containing compressed materials using the second embodiment of this invention just described with reference to FIGS. 2, 4, and 5–8 is similar to the process previously described for the first embodiment and therefore will not be set forth separately.

As can easily be seen, the pressure equalizing means incorporated into shaft 68 of the second embodiment is a very important feature especially when using the apparatus on vessels containing materials under very high pressure. One of the important features is that it allows the operator to perform the drilling operation without having to be concerned about working against a very high pressure once communication is made with the vessel contents because the invention provides means to equalize pressure against both ends of the shaft collar. Consequently, this is the preferred embodiment of the invention. However, although the first embodiment as described does not contain the pressure equalizing means, it is easily modified to incorporated this very desirable feature.

Another important feature of this invention is that after communication has been made with the contents of a vessel and the shaft and drill bit retracted, the main body of the apparatus, that is, the pressure tube assembly and related parts, can be disconnected from the ball valve. The vessel contents can then be safely discharged or recovered and the vessel fitted with a new valve or other fluid release controlling means and returned to service.

An important feature of both described embodiments of this invention is the ease with which they can be kept in good operating condition. Each of the embodiments requires only a minimum of maintenance.

Since prevention of corrosion of the working parts of the described apparatus is important so that the apparatus can be kept in use, an excellent maintenance procedure is to treat the apparatus by wiping, brushing, dipping or spraying it with certain acetylenic alcohols and acetylenic surfactants which may be combined with amines to provide synergistic action.

As previously stated with regard to the preferred embodiment, the apparatus of this invention is unique. No presently available apparatus can be used at the high pressures at which this invention can be safely used and no presently available apparatus can be used to gain access to and to discharge and/or recover the types of dangerous and corrosive fluids that can easily and safely be recovered with this invention.

I claim:

1. An apparatus for gaining access to the fluid contents of vessels and systems in which the contents are under pressures ranging in excess of 10,000 pounds per square inch and for discharging and recovering the fluid contents safely under controlled conditions without damaging the vessels and systems, comprising:
   a. a first member for regulating the flow of fluid released from the vessel;
   b. a second member connected to and in axial alignment with said first member for holding and containing the aforesaid fluid, said first and second members having a coaxial fluid conveying means;
   c. a rotatable member mounted for longitudinal movement with the aforesaid fluid conveying means of said first and second members, said rotatable member being provided with fluid conducting and pressure equalizing means for equalizing the pressure on both ends of said member;
   d. a cutting means detachably connected to the forward end of the rotatable member;
   e. adapter means to connect the apparatus to the vessel;
   f. handle means for rotating the rotatable member; and
   g. sealing means to prevent leakage of fluid from the apparatus, said means being provided by O-rings, and O-ring assemblies to allow for high pressures and to forestall hydrogen embrittlement and catastrophic failure of the apparatus.

2. The apparatus of claim 1 wherein the rotatable member is provided with a collar and two O-ring assemblies, the collar with the first assembly being towards the rear end of the member and the second assembly being towards the front end of the member.

3. The apparatus of claim 2 wherein the fluid conducting and pressure equalizing means of the rotatable member is provided by a passageway through the member from an orifice located between the second O-ring assembly and the point of attachment of the cutting member to an orifice located on the rear face of the collar of the rotatable member.

4. The apparatus of claim 3 wherein the coaxial fluid conveying means is provided with means for detecting leaks in the sealing means, said means being located between the first and second O-ring assemblies.

5. The apparatus of claim 4 wherein the rotatable member is provided with an O-ring immediately adjacent to the rear of the collar, said O-ring providing, when the rotatable member is retracted to the rear end of the coaxial fluid conveying means, a pressure tight safety seal to prevent escape of fluid in case of an accidental release of pressure.

6. The apparatus of claim 5 wherein the joining means is provided with U-shaped recessed means for removing chips and shavings from the path of the cutting means.

7. The apparatus of claim 6 wherein the material from which it is constructed is an austenitic steel characterized by having a face-centered cubic crystal structure.

8. An apparatus for gaining access to and safely recovering the contents of a vessel containing compressed fluids without damaging said vessel when a valve, which has a stem and a seat and is an integral part of said vessel and which is the only means provided to safely and controllably communicate with the compressed fluids, has been rendered inoperable and non-functioning, comprising, a pressure tube assembly and ball valve having a coaxial conduit, a rotatable shaft and drill bit mounted for longitudinal movement within the conduit, said shaft having a fluid conducting and pressure equalizing means for equalizing the pressure on both ends of the shaft, means connected to the shaft for rotating the shaft and drill bit, and adapter means for connecting the apparatus to the valve of the vessel, said apparatus having O-ring, and O-ring assembly sealing means to seal the parts to each other and the apparatus to the vessel valve pressure tight and said apparatus having internal surfaces that are free of notches and angles.

9. An apparatus for gaining access to and safely recovering the contents of a vessel containing compressed fluids without damaging the vessel when a valve, which has a stem and a seat and is an integral part of said vessel and which is the only means provided to safely and controllably communicate with the compressed fluids, has been rendered inoperable and non-functioning, comprising:
  a. an adapter having a U-shaped recess cavity and means for connecting the apparatus pressure tight to the valve of the vessel;
  a ball valve having O-ring sealing means connected pressure tight to the adapter;
  c. a pressure tube assembly, the rear portion of which has a helically ridged external surface, said assembly being connected pressure tight to the rear of the ball valve, and said assembly, ball valve and adapter having a common coaxially aligned conduit, said assembly having two bleed valves and pressure tight sealing means;
  d. a yoke and cylindrical member with means for moving over the helically ridged surface of the pressure tube assembly and having a clamping collar to hold it securely in place;
  e. a rotatable shaft mounted for longitudinal movement within the aforesaid conduit, said shaft having a drill bit detachably attached for cutting out the stem and seat of the vessel valve, a collar and two O-ring assemblies located to provide an unpressurized central portion in the conduit after communication is made with the pressurized fluid in the vessel, a passageway from an orifice located between one of the O-ring assemblies and the point of attachment of the drill bit to an orifice located on the rear face of the collar, and an O-ring immediately adjacent to the rear of the collar; and
  f. means releasably attached to the rear of said shaft for rotating the shaft and drill bit;
said apparatus having internal surfaces that are free of notches and angles.

10. A method of gaining access to and safely recovering the contents of a vessel containing compressed fluids when a valve, which has a stem and a seat and is an integral part of said vessel and which is the only means provided to safely and controllably communicate with the compressed fluids, has been rendered inoperable and non-functioning, comprising the steps of:
  a. attaching to the valve of said vessel an apparatus that can safely be used to gain access to and controllably recover from the vessel compressed fluids under pressures up to at least 10,000 pounds per square inch, said apparatus comprising, a pressure tube assembly and ball valve having a coaxial conduit, a rotatable shaft and drill bit mounted for longitudinal movement within the conduit, said shaft having a fluid conducting and pressure equalizing means for equalizing the pressure on both ends of the shaft, means connected to the shaft for rotating the shaft and drill bit, and adapter means for connecting the apparatus to the valve of the vessel, said apparatus having O-ring and O-ring assembly sealing means to seal pressure tight the parts to each other and the apparatus to the vessel valve and said apparatus having internal surfaces that are free of notches and angles;
  b. rotating the shaft and drill bit of the apparatus until communication is made with the contents of the pressurized vessel;
  c. retracting the rotatable shaft and drill bit;
  d. closing the ball valve;
  e. detaching the pressure tube assembly from the ball valve; and
  f. connecting to the ball valve a take-off means for the safe and controlled disposal of the contents of the pressurized vessel, said method being completed without damaging the vessel.

11. A method of gaining access to and safely recovering the contents of a vessel containing compressed fluidds when a valve, which has a stem and a seat and is an integral part of said vessel and which is the only means provided to safely and controllably communicate with the compressed fluids, has been rendered inoperable and non-functioning, comprising, the steps of:
  a. attaching to the valve of said vessel an apparatus that can safely be used to gain access to and controllably recover from the vessel compressed fluids under pressures up to at least 10,000 pounds per square inch, said apparatus comprising, an adapter having a U-shaped recessed cavity and means for connecting the apparatus pressure tight to the valve of the vessel;
  a bal valve having O-ring sealing means connected pressure tight to the adapter;
  a pressure tube assembly, the rear portion of which has a helically ridged external surface, said assembly being connected pressure tight to the rear of the ball valve, and said assembly, ball valve and adapter having a common coaxially aligned conduit, said assembly having two bleed valves and pressure tight sealing means;
  a yoke and cylindrical member with means for moving over the helically ridged surface of the pressure tube assembly and having a clamping collar to hold it securely in place; a rotatable shaft mounted for longitudinal movement within the aforesaid conduit, said shaft having a drill bit detachably attached for cutting out the stem and seat of the vessel valve, a collar and two O-ring assemblies located to provide an unpressurized central portion in the conduit after communication is made with the pressurized fluid in the vessel, a passageway from an orifice located between one of the O-ring assemblies and the point of attachment of the drill bit to an orifice located on the rear face of the collar, and an O-ring immediately adjacent to the rear of the collar; and means releasably attached to the rear of said shaft for rotating the shaft and drill bit;

said apparatus having internal surfaces that are free of notches and angles;

b. rotating the shaft and drill bit of the apparatus until communication is made with the contents of the pressurized vessel;

c. retracting the rotatable shaft and drill bit;

d. closing the ball valve;

e. detaching the pressure tube assembly from the ball valve; and f. connecting to the ball valve a take-off means for the safe and controlled disposal of the contents of the pressurized vessel, said method being complete without damaging the vessel.

12. The method of claim 11 wherein the contents of the vessel are under about 10,000 pounds per square inch pressure.

13. The method of claim 11 wherein the contents of the vessel are hazardous fluids selected from the group consisting of hydrogen, hydrogen chloride and hydrogen bromide.

* * * * *